United States Patent

Östbo

[11] 4,192,260
[45] Mar. 11, 1980

[54] AIR PREHEATING MEANS AT A VERTICAL STEAM OR HOT WATER BOILER

[76] Inventor: Nils Östbo, Volrat Thamsgatan 4, Götenburg, Sweden, 41278

[21] Appl. No.: 884,563

[22] Filed: Mar. 8, 1978

Related U.S. Application Data

[63] Continuation-in-part of Ser. No. 845,972, Oct. 27, 1977.

[51] Int. Cl.² ............................................. F22B 7/12
[52] U.S. Cl. .................................. 122/182 R; 122/121
[58] Field of Search ............... 122/DIG. 1, 121, 122, 122/182 R, 182 S, 182 T

[56] References Cited

U.S. PATENT DOCUMENTS

| | | | |
|---|---|---|---|
| 2,173,115 | 9/1939 | Hutto | 122/182 |
| 2,787,256 | 4/1957 | Ilune | 122/DIG. 1 |
| 3,638,622 | 2/1972 | Ostbo | 122/182 |

FOREIGN PATENT DOCUMENTS 237645 12/1964 Austria ..................................... 122/182

Primary Examiner—Edward G. Favors
Attorney, Agent, or Firm—Cantor and Singer

[57] ABSTRACT

A vertical steam or hot water boiler comprises a convection part and an aligned final combustion chamber. A flame tube passes centrally through the convection part, communicating at its lower end with the combustion chamber, and is provided with a burner at its upper end. An air preheating chamber is provided on top of the convection part, being separated from a turning chamber for the smoke gases by a common wall, a portion of said air preheating chamber extending towards the flame tube. The burner head is surrounded by a labyrinth formed by baffles, directing air form the air chamber to the burner.

3 Claims, 2 Drawing Figures

AIR PREHEATING MEANS AT A VERTICAL STEAM OR HOT WATER BOILER

CROSS-REFERENCE TO RELATED APPLICATION

This application is a continuation-in-part of copending application Ser. No. 845,972, filed Oct. 27, 1977.

BACKGROUND OF THE INVENTION

The present invention refers to steam or hot water boilers of the type including a convection part, formed as a cylindrical drum having plane end plates, within which at least two groups of smoke tubes are mounted concentrically with respect to a flame tube and extending between the end plates of the drum, an annular turning chamber, providing passage for the combustion products from one group of smoke tubes to the other group, being arranged adjacent to one of said end plates, being outwardly defined by a wall being parallel thereto, and where further an oil burner is fitted in the outward end of the flame tube. The aim of the invention is to provide simple and expedient means for preheating the combustion air, while simultaneously taking care of residual heat in the combustion gases.

SUMMARY OF THE INVENTION

An air supply means according to the invention includes an air chamber being fitted adjacent to the turning chamber, covering substantially the full extent of the wall outwardly defining said chamber, and having at least one air inlet at its periphery, said air chamber including a central portion extending through the turning chamber, towards the flame tube, being defined from the latter by a wall member guiding the air towards the burner.

In order to provide an increased heat transferring surface the outward wall defining the turning chamber is made of corrugated or flanged material.

Part of the air supply means may be formed as a labyrinth, directing the air towards the burner.

DESCRIPTION OF SOME PREFERRED EMBODIMENTS

Figure 1:
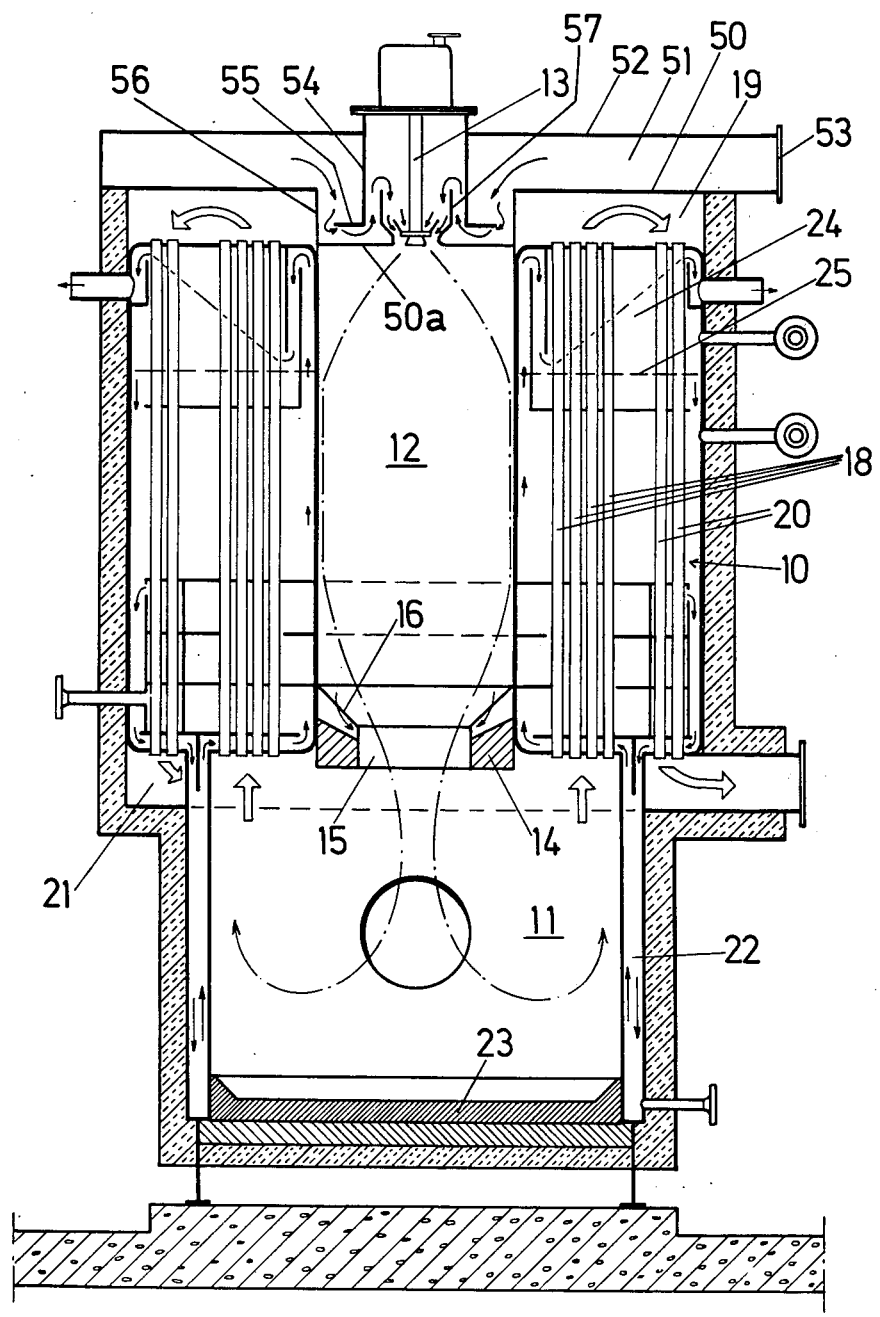
FIG. 1 shows a vertical section through a vertical steam boiler according to the invention.

The steam boiler shown in FIG. 1 is of a basically well known type, and includes an upper, cylindrical portion 10 and a lower final combustion chamber 11. A fire tube 12 is fitted centrally within the upper portion, and is in its upper end provided with a burner 13. The lower end of the fire tube is defined by a wall formed by a body 14 of refractory material and having an outlet passage 15.

Those parts of the flame, which pass along the envelope wall of fire tube 12, will be cooled, so the combustion there will not be complete. Due to the shape of the top surface 16 of the refractory body 14, which slopes towards outlet passage 15, the peripheral parts of the flame will be forced into the core of the flame, immediately at the passage. An intense heating and a thorough mixing occurs, so an efficient final combustion is brought about in chamber 11.

The upper, cylindrical portion 10 includes a number of smoke tubes arranged in two concentric groups. The inward of these groups 18 extends between the final combustion chamber 11 and an upper turning chamber 19, while the outward group 20 of smoke tubes extends downwards from the latter to a lower collecting chamber 21, which is connected to a flue passage (not shown). The number of smoke tubes within each group is selected so the flow velocity of the gas, in spite of the reduced volume due to cooling, will be substantially the same.

The final combustion chamber 11 is outwardly defined by a water cooled wall 22, which is connected to the upper portion 10, intermediate the two groups 18 and 20 of smoke tubes. The bottom structure 23 of the final combustion chamber is here made of refractory material but may, in bigger, or highly loaded boilers also be water cooled.

The steam drum 24 is formed within the cylindrical portion 10, and will thus enclose the upper end of the fire tube 12. The water level during normal operation is denoted by 25.

Boilers of the above described type are known in the art, and have an acceptable combustion efficiency. The restricted passage has, however, been formed from plate material, included in the fire tube, or in the lower end plate of the cylindrical portion 10, respectively. In view of the intense heating at this part of the furnace, an efficient water cooling has been provided. To some extent this cooling counteracts the endeavour to raise the temperature of the gases having passed along the envelope wall of the fire tube. In order to improve the mixing of the gases, it has been suggested that guide plates should be fitted within the passage to increase the turbulence in the final combustion chamber 11. The cooling, as well as the guide plates increase maufacturing costs.

The flame tube is here formed with a smooth, cylindrical envelope wall, which is easily attached to the lower end plate of the upper portion. A body 14 of refractory material is fitted in the lower end of the fire tube, and forms an end wall thereof and includes passage 15. Depending upon the size of the furnace, the body may be formed as a unitary piece, or may be built up by means of suitably shaped tiles, or possibly cast in a mould.

The upper turning chamber 19 is outwardly defined by a wall 50, and outside thereof there is an air chamber 51, which, in turn, is outwardly defined by a further wall 52, being parallel to wall 50. An inlet for combustion air from a fan (not shown) is arranged at the periphery of the air chamber, and is denoted by 53.

The oil burner 13 is mounted in a recessed portion of wall 50, a portion 50a of said wall closing off flame tube 12 outwardly, substantially level with the upper end plate of convention part 10. The nozzle head of the burner is located in an opening in wall portion 50a. The burner 13 is separated from chamber 51 by an annular baffle plate 54, projecting downwardly from the outer wall 52 of said chamber. The baffle plate extends almost to wall portion 50a, and merges into a guide plate 55, directed outwardly, in parallel to wall portion 50a, and extending almost to a wall 56, defining the recessed portion of wall 50 at air chamber 51.

Wall portion 50a is provided with an outwardly directed collar 57, which extends into the shape enclosed by baffle plate 54. The latter forms, together with guide plate 55 and collar 57 a labyrinth for the air flowing to the burner, which guarantees an even flow and also an efficient cooling of wall portion 50a.

Due to the extension of air chamber 51 all over the gas turning chamber 50, an even distribution of the incoming air, as well as a satisfactory preheating is obtained In order to increase the heat transfer, wall 50 may be manufactured from corrugated or flanged material.

The invention may also be used with hot water boilers. The only difference is that the plates guiding the water circulation adjacent to the steam space are removed, and the convection drum 10 is completely filled with water.

Figure 2:
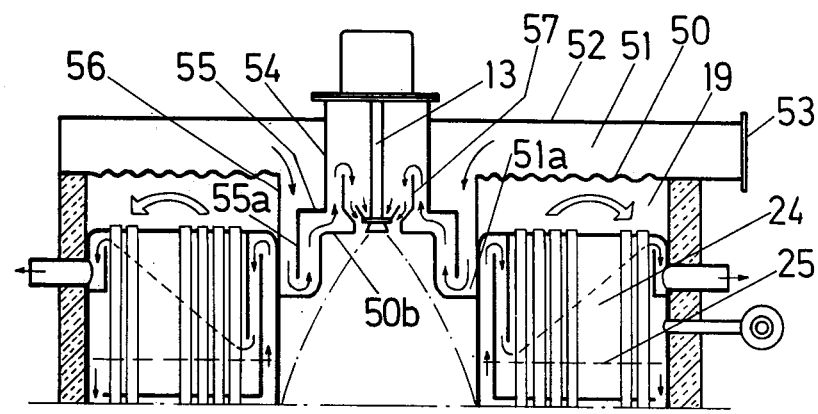
FIG. 2 shows the upper part of a similar section through a modified embodiment of the boiler.

FIG. 2 shows a modification of the labyrinth around the burner. The aim is to provide a higher degree of preheating and furthermore to reduce the risk of overheating the upper end of the flame tube, which is not water cooled.

The flame from the burner will, close by the nozzle head, have a conical shape, and it is possible to shape wall portion 50b so it, without interfering with the flame, outside thereof will enclose an annular chamber 51a, which thus will be located within the flame tube. The passing air will provide a cooling of the flame tube, while simultaneously absorbing heat.

Baffle plate 54 and guide plate 55 are similar to those of the previous embodiment. At the outward edge of guide plate 55 there is a second baffle 55a, extending downwardly into space 51a. Wall portion 56b is, as in the previous embodiment, provided with a collar 57, extending into the space enclosed by the first baffle plate 54.

Wall portion 50b may be formed so it more closely follows the conical shape of the flame, but should not extend so far into the tube as to actually come into contact with the flame.

What I claim is:

1. In a vertical boiler comprising a convection part and a final combustion chamber aligned therewith;
   a cylindrical drum having upper and lower plane end walls;
   a flame tube located centrally within said drum, and extending between the end plates thereof, said flame tube having burner means at its end at said upper end plate, and communicating with said final combustion chamber at its opposite end;
   at least two groups of smoke tubes arranged concentrically, one outside the other, around said flame tube, extending between said end plates, an inward group of said at least two groups communicating at its lower end with said final combustion chamber;
   a turning chamber located outside said upper end plate for communicating said at least two groups of smoke tubes and being outwardly defined by a wall parallel to and above said upper end plate;
   a smoke gas outlet communicating with an outward group of said at least two groups of smoke tubes and the lower end thereof;
   the improvement comprising an air chamber adjacent to and above said turning chamber, covering a substantial extent of the wall outwardly defining said chamber, and having at least one air inlet at its periphery, said air chamber comprising:
   a tubular wall member forming an upwardly extending extension of said flame tube for defining a centrally location portion of said air chamber from said upper gas turning chamber, an end wall member extending inwardly from said flame tube thereby defining said centrally located portion from said flame tube, and having an opening accomodating the head of said burner,
   an annular baffle plate extending downwardly from said wall outwardly defining said air chamber, reaching almost to said last mentioned end wall member,
   a guide plate attached to the lower end of said baffle plate in a substantially parallel relationship to said end wall member and directed outwardly from said baffle plate, and a collar projecting upwardly from said last mentioned end wall member around the opening therein accomodating said burner head and inside of said baffle plate.

2. In a vertical boiler comprising a convection part and a final combustion chamber aligned therewith;
   a cylindrical drum having upper and lower plane end walls;
   a flame tube located centrally within said drum, and extending between the end plates thereof, said flame tube having burner means at its end at said upper end plate, and communicating with said final combustion chamber at its opposite end;
   at least two groups of smoke tubes arranged concentrically, one outside the other, around said flame tube, extending between said end plates, an inward group of said at least two groups communicating at its lower end with said final combustion chamber;
   a turning chamber located outside said upper end plate for communicating said at least two groups of smoke tubes and being outwardly defined by a wall parallel to and above said upper end plate;
   a smoke gas outlet communicating with an outward group of said at least two groups of smoke tubes at the lower end thereof;
   the improvement comprising an air chamber adjacent to and above said turning chamber, covering a substantial extent of the wall outwardly defining said chamber, and having at least one air inlet at its periphery, said air chamber comprising;
   a tubular wall member defining a centrally located portion of said air chamber from said upper gas turning chamber,
   said centrally located portion extending into the upper part of said flame tube,
   a stepped end wall member extending inwardly and upwardly from said flame tube thereby defining said centrally located portion from the remainder of said flame tube, having an opening accomodating the head of said burner, about level with said upper end wall and forming an annular air space within the upper part of said flame tube,
   a first annular baffle plate extending downwardly from said wall, outwardly defining said air chamber, and reaching about to the level of said burner head,
   a first guide plate attached to the lower end of said first baffle plate, and directed outwardly therefrom,
   a second annular baffle plate extending downwardly from said guide plate, extending into said annular air space, and
   a collar projecting upwardly from said stepped end wall member, around the opening therein and inside of said first baffle plate.

3. A boiler according to claim 2, in which the outward wall defining the turning chamber is made of corrugated or flanged material.

* * * * *